United States Patent Office 2,845,930
Patented Aug. 5, 1958

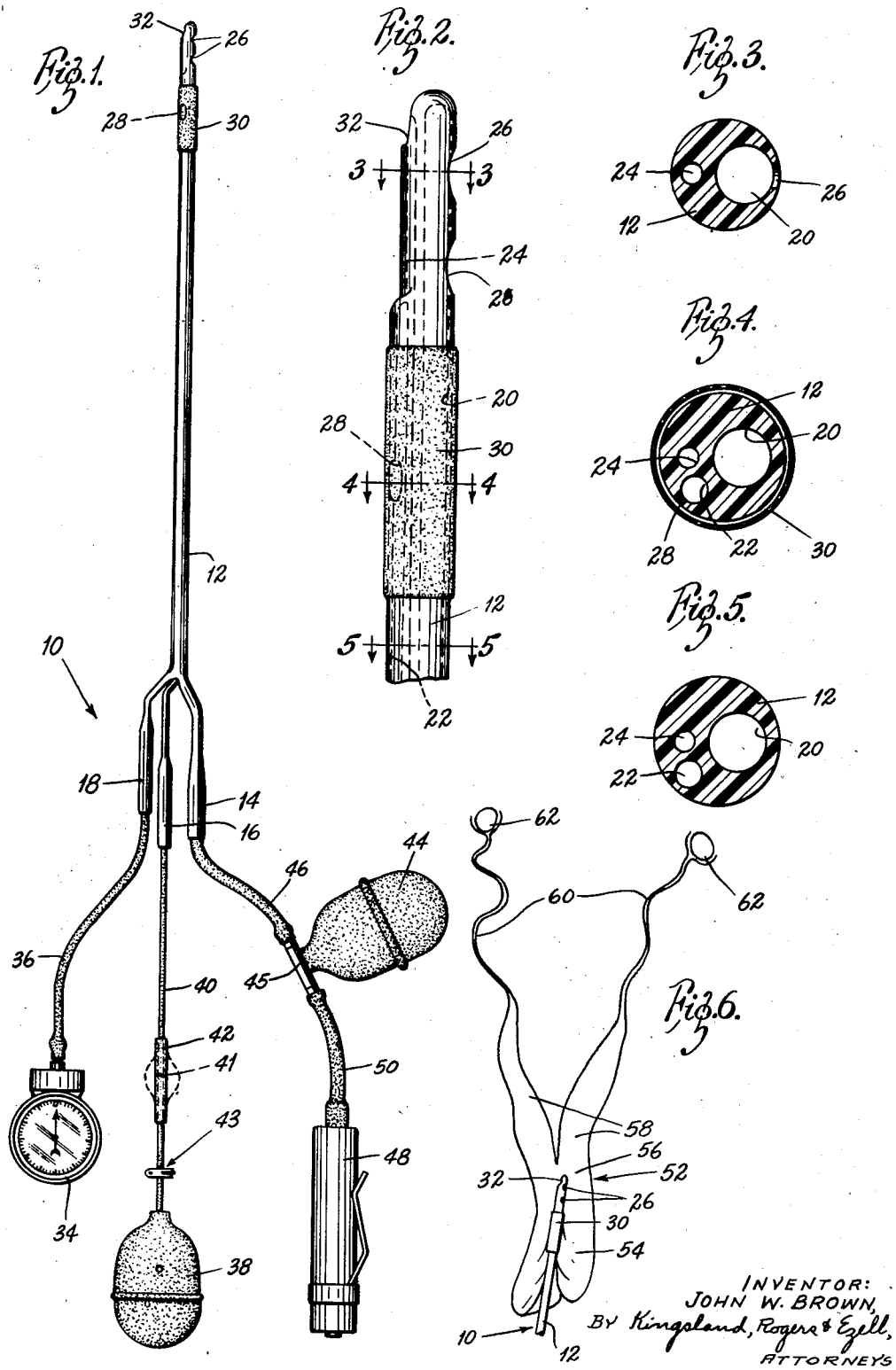

2,845,930

MEANS FOR DETERMINING PATENCY IN THE UTERUS OF COWS AND SIMILAR ANIMALS

John William Brown, De Soto, Mo.

Application September 7, 1954, Serial No. 454,414

2 Claims. (Cl. 128—348)

The present invention relates generally to animal diagnosis, and more particularly to a novel method of determining patency in the uterus of cows and similar animals.

The veterinarian has long needed a method of determining patency in the uterus of cows, and the like, which is reasonably accurate, and which can be employed quickly, readily, and with safety.

The present invention satisfies this long existing want, and, in brief, comprises applying controlled air under pressure first to one oviduct channel and then to the other of the cow's uterus, or to both simultaneously, and, in each instance, determining whether or not there is any leakage. Diminishing of an established pressure in one or the other channel denotes a free passage, hence, patency. In addition, the invention contemplates treatment to the blocked oviduct with air borne or fluid medicants.

Therefore, an object of the present invention is to provide a novel method of determining patency in the uterus of a cow, or the like, by the use of air under pressure which is reasonably accurate, simple, and can be employed with safety.

Another object is to provide a novel method of determining patency in the uterus of a cow, or the like, which requires a minimum of apparatus and which can be quickly, readily, and easily used by veterinarians.

Another object is to provide a novel method of determining patency in the uterus of a cow, or the like, which reduces to a minimum annoyance to the animal during the test and which has no after effect.

Another object is to provide a novel method of treating a blocked oviduct upon determining patency.

The foregoing and other objects and advantages are apparent from the following description taken with the accompanying drawing, in which:

Figure 1 is a plan view of apparatus by which the present novel method of determining patency in the uterus of cows, and the like, may be carried out;

Figure 2 is an enlarged view of the end portion thereof;

Figures 3, 4 and 5 are further enlarged transverse cross-sectional views on the lines 3—3, 4—4, and 5—5, respectively; and Figure 6 is a diagrammatic view of the uterus of a cow with the apparatus of Figures 1–5 in position for carrying out the present novel method.

Referring to the drawing more particularly by reference numerals, 10 indicates generally apparatus by which the present novel method of determining patency in the uterus of cows may be effected. The illustrative apparatus 10 includes a shaft 12 which may be of suitable plastic or other material and is illustrated as of round cross section. At one end of the shaft 12 are three hollow tubes 14, 16, and 18, preferably integral therewith, which communicate with passages 20, 22, 24, respectively.

It will be noted that the passage 20 extends the full length of the shaft 12 and leads to two openings 26 at the outer end thereof. Passage 22 extends through the shaft 12 to an opening 28 which leads into a resilient sleeve 30 of rubber, or the like, secured at each end to the exterior of the shaft 2, thereby providing a sack which may be blown up for a seal, as is set forth below. The sleeve 30 may be three to six inches in length. The passage 24 extends the full length of the shaft 12, and leads to an opening 32.

An air gauge 34 is connected to the tube 18 by a flexible hose 36.

An air bulb 38 is connected to the tube 16 by a hose 40, intermediate which is a leak detector sleeve 42 which is in communication with the hose 40 by a suitable opening 41 therein and which will expand, as indicated in dotted lines, when the sleeve 30 is inflated. A releasable, conventional pincher clamp 43 is mounted on the hose 40 between the sleeve 42 and the bulb 38.

A main air bulb 44 having a valve tube unit 45 is connected to the tube 14 by a hose 46, there being an air filter 48 connected to the bulb 44 by a hose 50. The air bulb 44 is of conventional construction and includes two one-way valves (not shown) in the valve tube unit 45 to permit air to enter the bulb 44 through the filter 48 as it expands and to permit air to be forced through the hose 46, but not through the hose 50 as the bulb 44 is squeezed. Flap, ball, or any one-way valves may be used.

In Figure 6, there is diagrammatically illustrated the uterus 52 of a cow comprising the cervix 54, the main body 56, the two horns 58, the oviducts 60, and ovaries 62. The oviducts 60 are funnel-shaped at the ovaries 62 and open into the peritoneal cavity of the animal, and, as indicated, the ovaries 62 do not block the oviducts 60 at the funnel portion. Hence, air introduced at the cervix 54 can pass around the ovaries 62 and enter the peritoneal cavity, the uterus 52 not being a closed system. The apparatus 10 is shown in position in the uterus 52 for carrying out the present novel method of determining patency in the uterus of a cow.

Air is pumped into the sleeve 30 by use of the bulb 38 to close the cervix 54, air at the same time expanding the sleeve 42, following which the pincher clamp 43 is closed on the hose 40. Thereafter, air is pumped into the uterus 52 by the bulb 44 until some predetermined pressure reading registers on the air gauge 34, it only being necessary to establish a pressure sufficient to give a reading which will permit return of the needle to zero. If the pressure reached on the air gauge 34 remains constant, the oviducts 60 are blocked. If the pressure indicated on the gauge 34 drops off, it is an indication that one or both oviducts 60 are free and that air is being dissipated into the peritoneal cavity of the animal. A very slow drop in pressure on the gauge 34 usually indicates a block in one oviduct 60, which can be verified and isolated by extending the hand through the rectum of the animal and manually closing first one and then the other oviduct 60 with the fingers. Thereafterwards, the present invention contemplates treatment of the blocked oviduct 60 by air borne or fluid medicants applied by the apparatus 10.

Usually, only several minutes are required to test an animal, since air will leak into the peritoneal cavity within seconds to a minute or so after introduction into the uterus. Hence, it is not necessary to wait for an extended period if air pressure remains constant for several minutes.

Should the sealing sleeve 30 leak for some reason, the leak detector sleeve 42 will also deflate, which will warn the user that drop in pressure on the gauge 34 is caused by leakage of air through the cervix 54.

The shaft 12 is illustrated as a rigid member. However, a soft flexible tubing can be employed stiffened with a heavy wire for insertion purposes. It should also be noted that gases other than air may be used.

It is apparent that the present novel method is simple, accurate, and safe, and that it may be readily, quickly, and easily applied by a veterinarian with minimum annoyance to animals.

It is to be understood that the foregoing description and the accompanying drawing have been given by way of illustration and example. It is also to be understood that changes in form of the several parts, substitution of equivalent elements or steps, and rearrangement of parts or steps, which will be readily apparent to one skilled in the art, are contemplated as within the scope of the present invention, which is limited only by the claims which follow.

What is claimed is:

1. Apparatus for determining the patency in cows, and the like, comprising an elongated member having multiple passages, a sleeve about said member near one end sealed at the edges thereof, one of said passages opening into said sleeve, two additional passages opening at the end of the member beyond said sleeve, said three passages opening independently at the other end of said member, means for supplying a gas into said sleeve, means for detecting a leak in said sleeve, means for supplying gas to one of said two additional passages, and gauge means connected to said other of said two additional passages.

2. Apparatus for determining the patency in cows and the like, comprising an elongated member having at least two passages, a sleeve about said member near one end sealed at the edges thereof, one of said passages opening into said sleeve, a second passage opening at the end of the member beyond said sleeve, said passages opening independently at the other end of said member, means for supplying a gas into said sleeve, means for detecting a leak in said sleeve, means for supplying gas to the second passage, and means for determining the pressure of gas supplied through said second passage.

References Cited in the file of this patent

UNITED STATES PATENTS 2,480,041    Myller _____ Aug. 23, 1949

OTHER REFERENCES

American Journal of Surgery, for 1937, pp. 169–171.
American Journal of Surgery, January 1943, p. 143; vol. LIX, No. 1.